2,858,306

POLYMERIC ETHYLENEIMIDO PHOSPHORUS NITRILES

Rudi F. W. Rätz and Christoph J. Grundmann, Columbus, Ohio, assignors to Olin Mathieson Chemical Corporation, a corporation of Virginia No Drawing. Application May 8, 1957
Serial No. 657,722

12 Claims. (Cl. 260—239)

This invention relates to polymeric ethyleneimido phosphorous nitriles and their preparation.

It has now been found that the polymeric phosphorus nitrilic halides react easily with ethyleneimine and its homologs to produce novel polymeric ethyleneimido phosphorus nitriles in which all halogen atoms have been substituted by ethyleneimido groups.

The polymeric phosphorus nitrilic halides (or phosphonitrile halides) suitable for the reaction have the generic formula $$(X_2P{\equiv}N)_n \qquad (I)$$

wherein X is chlorine, bromine or fluorine and $n$ is a whole number, e. g. a small whole number of at least 3 and up to 7 or higher and preferably 3 or 4. For example, the fluorides $(F_2PN)_n$, the chlorides $(Cl_2PN)_n$, and the bromides $(Br_2PN)_n$, are useful. Within the polymeric series the trimeric and the tetrameric halides are particularly useful starting materials.

The ethyleneimines suitable for the reaction have the formula

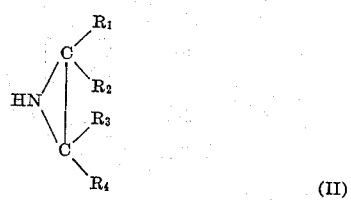

wherein $R_1$, $R_2$, $R_3$ and $R_4$ are hydrogen, alkyl, e. g. methyl, ethyl, propyl, butyl, or aryl, e. g. phenyl. Ethyleneimines suitable for the reaction include, for example, ethyleneimine, 2-methyl-ethyleneimine, 2,2-dimethyl-ethyleneimine, 2-phenyl-ethyleneimine, 2,3-dimethyl-ethyleneimine, 2,3-diphenyl-ethyleneimine, 2,2,3-triethyl-ethyleneimine and 2,2-diethyl-3-n-propyl-ethyleneimine.

The reaction of this invention proceeds according to the following equation:

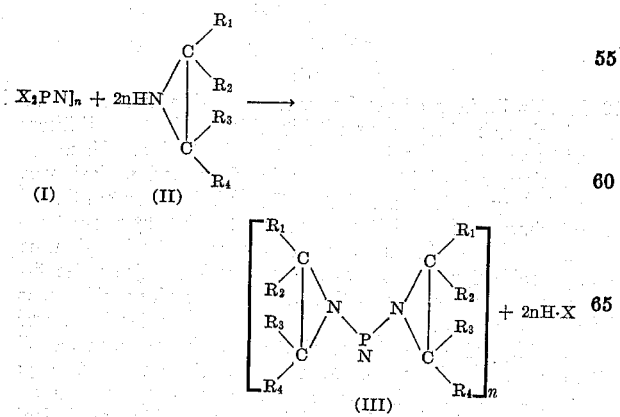

Thus, the new polymeric ethyleneimido phosphorus nitriles of this invention have the Formula III above.

$R_1$, $R_2$, $R_3$ and $R_4$ have the same meanings as in the ethyleneimine of Formula II and $n$ is a whole number, e. g. a small whole number of at least 3 and preferably 3 or 4.

Since the reaction proceeds with the formation of a hydrogen halide, this must be bound by a hydrogen halide acceptor in order to complete the reaction. This can be done, for example, by using a 100 percent excess of the applied ethyleneimine derivative, or by adding a tertiary base, such as triethylamine, dimethylaniline, or pyridine in the required amount to the reaction mixture. The reaction is preferably carried out in a suitable solvent which is inert to the phosphorus nitrilic halide as well as to the applied ethyleneimine. Suitable solvents are, for example, benzene, toluene, xylene, ether, dioxane, and tetrahydrofurane.

The reaction between the phosphorus nitrilic halide and the ethyleneimine is carried out by admixing the reactants and usually proceeds exothermically at room temperature. If necessary, the reaction can be initiated by short warming. It is, however, preferable in order to obtain complete substitution of all halogen atoms to allow the reaction to come to completion by standing for a suitable period of time, e. g. for about one day to about four weeks at room temperature, depending on the reactants. In some cases, the reaction can be completed in a shorter time by heating the reaction mixture for several hours to a temperature not exceeding 100° C., but in general, because of the highly reactive nature of the polymeric ethyleneimido phosphorus nitriles, the use of elevated temperatures during this reaction is not recommended.

In the reaction, as noted in the equation described above, the stoichiometric proportions of the reactants are dependent on the number of units in the polymeric phosphorus nitrilic halide, i. e. the moles of the ethyleneimine used equals the number of moles of the polymeric nitrilic halide used multiplied by twice the number of units in the polymeric nitrilic halide. For example, the stoichiometric ratio when a trimeric nitrilic halide is used is one mole of the trimer to six moles of the ethyleneimine.

Since the hydrohalide of the organic base, formed as a by-product during the reaction, is usually insoluble in the applied solvent, whereas the desired ethyleneimido-phorphorus nitrile is generally easy soluble, the isolation of the desired reaction product encounters no difficulty. The hydrohalide salts are removed by filtration and the filtrate concentrated, preferably in a vacuum, in order to obtain the desired compound. The yields are often almost quantitative.

The new polymeric ethyleneimido phosphorus nitriles are useful in the field of resins and plastics. When heated with di- or poly-functional alcohols or amines they form clear colorless, hard resins (see Example VI below). Suitable alcohols for this reaction are, for example, ethylene glycol, glycerol, pentaerythrol, hexamethyleneglycol, diethyleneglycol, triethyleneglycol, resorcinol and bis-p-hydroxyphenyl-dimethylmethane. Suitable amines are, for example, ethylenediamine, propylenediamine, hexamethylenediamine and p-phenylenediamine.

The ethyleneimido phosphorus nitriles can also be transformed into valuable resinous materials, by treating with alkanolamines, such as ethanolamine, diethanolamine, and triethanolamine, or with amides and imides of aliphatic mono- or poly-basic acids, such as myristic acid amide, stearic acid amide, succinic imide, adipic acid diamide.

The ethyleneimido phosphorus nitriles can also be integrated into the known amino-plasts, such as urea-formaldehyde resins, melamine-formaldehyde resins, and other polyamino-formaldehyde resins.

Other resinous compounds suitable in the plastic and coating arts can also be prepared by reaction between the ethyleneimido phosphorus nitriles and alkyd resins containing unesterified hydroxyl groups (see Example VIII below).

The ethyleneimido phosphorus nitriles also can be transformed into water-clear resins by the action of acids and/or heat (see Example VII below). Contrary to known materials prepared from other ethyleneimido derivatives, the new products establish a high degree of flame resistance, owing to their content of the thermally very stable and not combustible phosphorus-nitrogen rings. The obtained resins and plastics are also valuable materials for the treatment of textiles to improve water-resistance and resistance to shrinking or creasing. Others can be used as adhesives plywood, or as laminating varnishes for paper, cloth, asbestos and leather.

Due to the reactivity of the ethyleneimido groups contained in ethyleneimido phosphorus nitriles, the compounds can furthermore serve as valuable intermediates in the synthesis of other phosphorus containing products, for example, insecticides.

Compounds of this invention and their preparation will be illustrated by reference to the following examples.

*Example I*

The amount of 13.94 grams of trimeric phosphorus nitrilic chloride $(Cl_2PN)_3$, dissolved in 100 milliliters of anhydrous benzene was added dropwise with stirring to a solution of 10.32 grams of ethyleneimine,

and 24.24 grams of anhydrous triethylamine in 200 milliliters of anhydrous benzene. The temperature was maintained at 30° C. After four hours the formed triethylamine hydrochloride was removed by filtration and five grams more of ethyleneimine plus 12 grams of triethylamine were added to the filtrate. The solution was allowed to stand for three days at room temperature and finally heated for one hour at 50° C. The formed triethylamine hydrochloride was filtered off again and the benzene removed from the filtrate by vacuum distillation. The remaining residue solidified after cooling and was recrystallized from anhydrous n-heptane. Colorless crystals, melting at 147.5° C. were obtained. Yield: 12.5 grams or 81% of the theory. The analysis confirms the formula of a 2,2,4,4,6,6-hexaaziridino-2,4,6-triphospha-1,3,5-triazine (trimeric bis-ethyleneimido-phosphorus nitrile).

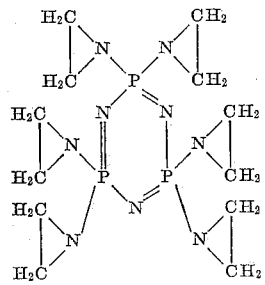

Calcd. for $C_{12}H_{24}N_9P_3$: C, 37.21; H, 6.24; N, 32.55; P, 24.00. Found: C, 37.28, 37.10; H, 6.26, 6.30; N, 32.39, 32.58; P, 23.92, 23.71.

An ebullioscopic molecular weight determination confirms the structure drawn above. The compound is soluble in water, hot benzene, and chloroform, but insoluble in ether.

*Example II*

The amount of 7.5 grams of ethyleneimine was dissolved in 100 milliliters of dry benzene and a solution of 3.48 grams of trimeric phosphorus nitrilic chloride in 50 milliliters of dry benzene added with stirring within 30 minutes. After standing overnight, the formed ethyleneimine hydrochloride was removed by filtration. Evaporating the benzene filtrate in a vacuum yielded a solid residue which melted at 147.5° C. after one recrystallization from n-heptane. Yield: 3.84 grams, or 99% of the theory. The product was proved to be identical with that obtained in Example I by a mixed melting point.

*Example III*

A solution of 46.4 grams of tetrameric phospho-nitrilic chloride $(Cl_2PN)_4$, in 250 milliliters of dry benzene was added dropwise with stirring to a solution of 50 grams of ethyleneimine and 100 grams of triethylamine in 80 milliliters of dry benzene. After 24 hours at 30° C. the formed triethylamine hydrochloride was filtered off. After cooling to 15° C. a well-crystallized product separated from the benzenic solution which was collected on a Buchner-funnel. The filtrate was concentrated to 150 ml. and gave on standing at room temperature an additional amount of the same product. Yield: 41 grams, or 79.5% of the theory; melting point 262° C. after recrystallization from n-heptane. The melting point of this compound can only be determined by using a preheated plate (255°) of a Fisher-Johns-apparatus. Starting the melting point determination at room temperature leads only to polymerization of the product. According to analysis the product is the tetrameric bis-ethyleneimido phosphorus nitrile 2,2,4,4,6,6,8,8, octa-aziridino-2,4,6,8-tetraphospha-1,3,5,7-tetra-aza-cyclooctatetraene-1,3,5,7 of the following constitution:

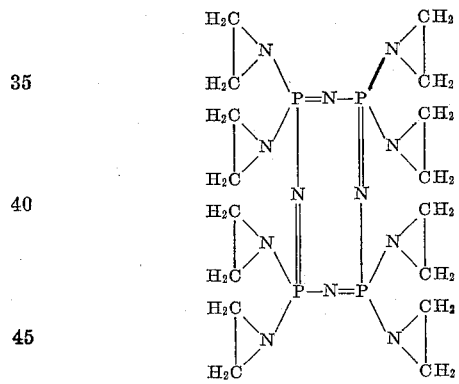

Calcd. for $C_{16}H_{32}N_{12}P_4$: C, 37.21; H, 6.24; N, 32.55; P, 24.00. Found: C, 36.98; H, 6.48; N, 32.43; P, 24.05.

An ebullioscopic molecular weight determination confirms the structure shown above.

*Example IV*

To a solution of 8 grams of dry triethylamine and 5 grams of 2-methylethyleneimine,

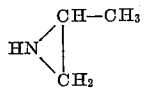

in 50 milliliters of dry benzene a solution of 3.48 grams of trimeric phosphorus nitrilic chloride in 20 milliliters of benzene was dropwise added with stirring. Since the reaction was slightly exothermic, the reaction flask was cooled by an ice-water bath. The stirring was continued for three hours. After 24 hours standing at room temperature, the almost quantitatively formed triethylamine hydrochloride was removed by filtration. From the filtrate the solvent was distilled off and the oily residue was extracted with 30 milliliters of cold Skellysolve B. After distilling off the Skellysolve, a clear, almost colorless oil remained. Yield: 4.0 grams, or 93.3% of the theory; $n_D^{25°}=1.5071$. The crude product decomposed on an attempt to distill it in a high vacuum. The analytical values are, however, in satisfactory agreement with the expected constitution of a trimeric bis-2-methylethyleneimido-phosphorus nitrile 2,2,4,4,6,6-hexa-(2'-methylaziridino)-2,4,6-triphospha-1,3,5-triazine.

Calcd. for $C_{18}H_{36}N_9P_3$: C, 45.85; H, 7.70; N, 26.74. Found: C, 44.75; H, 8.13; N, 25.26.

*Example V*

A solution of 3.48 grams of trimeric phosphorus nitrilic chloride in 20 milliliters of benzene was dropwise added with stirring to a solution of 8 grams of triethylamine and 5.3 grams of 2,2-dimethylethyleneimine

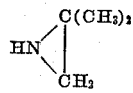

in 70 milliliters of dry benzene. The slightly exothermic reaction was moderated by external cooling with ice-water. After 30 hours standing the almost quantitative amount of triethylamine hydrochloride was removed by filtration. The solvent was distilled off and the oily residue was allowed to stand in a 5 mm. vacuum for two hours at room temperature. After extraction of the residue with 30 milliliters Skellysolve B and removing this solvent in vacuum, a clear oil was obtained. This oil is insoluble in water, but easily soluble in ether, ethanol, and hydrocarbons. Yield: 4.5 grams, or 95% of the theory; $n_D^{25°}=1.5110$. It could not be distilled without decomposition even in a high vacuum. The analysis corresponds to the expected structure, trimeric bis-2,2-dimethyl-ethyleneimido-phosphorus nitrile 2,2,4,4,6,6-hexa-(2',2'-dimethyl-aziridino)-2,4,6-triphospha-1,2,5-triazine.

Calcd. for $C_{24}H_{48}N_9P_3$: P, 17.51. Found P, 16.74.

*Example VI*

25.8 grams of trimeric bis-ethyleneimido phosphorus nitrile, obtained by the procedure described in Example I or II, was mixed with 21.2 grams of diethylene glycol and the mixture heated in an oil bath not above 145° C. At first a viscous oil is formed which changes to a water-clear, colorless resin within 30 minutes. The resin has a remarkable resistance against heat and is practically not inflammable.

*Example VII*

10 grams of tetrameric bis-ethyleneimido phosphorus nitrile, obtained as described in Example III, were slowly heated up to 160° C. within two hours. The crystalline material sintered and gradually changed to a clear colorless, hard resin which is not inflammable.

*Example VIII*

To 90 grams of an alkyd resin, prepared from glycerol and adipic acid and still containing about 25% of free hydroxyl groups, 10 grams of the trimeric bis-ethyleneimido phosphorus nitrile were added. The mixture was dissolved in 200 grams of diethylene glycol monomethylether and refluxed for one hour. The resulting solution gives flexible films when coated on panels and heated for one hour to 150° C.

What is claimed is:

1. Polymeric ethyleneimido phosphorus nitriles of the formula

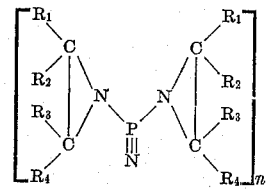

wherein $R_1$, $R_2$, $R_3$ and $R_4$ are selected from the group consisting of hydrogen, alkyl radicals of 1 to 4 carbon atoms and phenyl and $n$ is a small whole number of from 3 to 7.

2. Trimeric ethyleneimido phosphorus nitriles of the formula of claim 1 wherein $n$ is 3.

3. Trimeric bis-ethyleneimido-phosphorus nitrile.

4. Trimeric bis-2-methyl-ethyleneimido-phosphorus nitrile.

5. Trimeric bis-2,2-dimethyl-ethyleneimido-phosphorus nitrile.

6. Tetrameric ethyleneimido phosphorus nitriles of the formula of claim 1 wherein $n$ is 4.

7. Tetrameric bis-ethyleneimido-phosphorus nitrile.

8. The method of producing polymeric ethyleneimido phosphorus nitriles which comprises admixing a polymeric phosphorus nitrilic halide of the formula $$(X_2PN)_n$$

wherein X is selected from the group consisting of chlorine, bromine and fluorine and $n$ is a small whole number of from 3 to 7, with an ethyleneimine of the formula

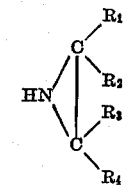

wherein $R_1$, $R_2$, $R_3$ and $R_4$ are selected from the group consisting of hydrogen, alkyl radicals of 1 to 4 carbon atoms and phenyl, at a temperature from about room temperature to about 100° C.

9. The method of claim 8 in which the polymeric phosphorus halide is trimeric phosphorus nitrilic chloride and the ethyleneimine is ethyleneimine.

10. The method of claim 8 in which the polymeric phosphorus halide is trimeric phosphorus nitrilic chloride and the ethyleneimine is 2-methyl-ethyleneimine.

11. The method of claim 8 in which the polymeric phosphorus halide is trimeric phosphorus nitrilic chloride and the ethyleneimine is 2,2-dimethyl-ethyleneimine.

12. The method of claim 8 in which the polymeric phosphorus halide is tetrameric phosphorus nitrilic chloride and the ethyleneimine is ethyleneimine.

References Cited in the file of this patent

Berichte, volume 81, pages 547–552 (1948).